US008721130B2

(12) United States Patent
Uchida

(10) Patent No.: US 8,721,130 B2
(45) Date of Patent: May 13, 2014

(54) VEHICLE HEADLAMP WITH CUT-OFF LINE FORMING REFLECTOR

(75) Inventor: Naoki Uchida, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 180 days.

(21) Appl. No.: 13/099,467

(22) Filed: May 3, 2011

(65) Prior Publication Data

US 2011/0280028 A1 Nov. 17, 2011

(30) Foreign Application Priority Data

May 12, 2010 (JP) ................................ 2010-110037

(51) Int. Cl.
*B60Q 1/04* (2006.01)

(52) U.S. Cl.
USPC ........... 362/316; 362/507; 362/518; 362/539; 362/297; 362/305

(58) Field of Classification Search
USPC ............ 362/507, 516, 518, 519, 539, 296.01, 362/297, 304, 305
See application file for complete search history.

(56) References Cited

U.S. PATENT DOCUMENTS

| | | | | |
|---|---|---|---|---|
| 4,208,704 | A * | 6/1980 | Draper | 362/518 |
| 4,351,018 | A * | 9/1982 | Fratty | 362/215 |
| 4,841,423 | A * | 6/1989 | Luciani | 362/304 |
| 5,086,376 | A * | 2/1992 | Blusseau | 362/518 |
| 5,192,124 | A * | 3/1993 | Kawashima et al. | 362/518 |
| 6,062,714 | A * | 5/2000 | Serizawa et al. | 362/518 |
| 6,626,565 | B2 * | 9/2003 | Ishida | 362/514 |
| 6,821,004 | B2 * | 11/2004 | Tatsukawa et al. | 362/465 |
| 6,824,301 | B2 * | 11/2004 | Kinouchi | 362/518 |
| 7,722,234 | B2 * | 5/2010 | Matsumoto | 362/539 |
| 2007/0274086 | A1 | 11/2007 | Takeda et al. | |
| 2010/0067249 | A1 * | 3/2010 | Suzuki | 362/539 |

FOREIGN PATENT DOCUMENTS

| | | | |
|---|---|---|---|
| DE | 202010003058 | U1 | 6/2010 |
| EP | 2182270 | A2 | 5/2010 |
| EP | 2309172 | A2 | 4/2011 |
| FR | 2853395 | | 10/2004 |
| JP | 2003-123517 | A | 4/2003 |
| JP | 2005063754 | | 3/2005 |
| JP | 2008-171743 | A | 7/2008 |
| JP | 2008-226706 | A | 9/2008 |
| JP | 2008-226707 | A | 9/2008 |
| JP | 2009-117279 | A | 5/2009 |
| JP | 2009245637 | | 10/2009 |
| WO | WO 2010045763 | A1 | 4/2010 |

OTHER PUBLICATIONS

Extended European Search Report issued in counterpart European Application No. 11165774.8 on Sep. 6, 2011.
Office Action, dated Dec. 17, 2013, issued by the Japanese Patent Office in counterpart Japanese Application No. 2010-110037.

* cited by examiner

*Primary Examiner* — Ismael Negron
(74) *Attorney, Agent, or Firm* — Sughrue Mion, PLLC

(57) ABSTRACT

A lighting apparatus including a light source having a light emitting surface, and a reflector configured to reflect light from the light source to form a light distribution pattern having a first cutoff line and a second cutoff line such that the first cutoff line and the second cutoff line form an angle with each other. The reflector is configured to form the first cutoff line and the second cutoff line by reflection images of the same edge of the light emitting surface.

13 Claims, 8 Drawing Sheets

VEHICLE HEADLAMP WITH CUT-OFF LINE FORMING REFLECTOR

CROSS-REFERENCE TO RELATED APPLICATION

The present application claims priority from Japanese Patent Application No. 2010-110037 filed on May 12, 2010, the entire content of which is incorporated herein by reference.

FIELD OF INVENTION

The present invention relates to a lighting apparatus having a reflector to reflect light from a light source.

DESCRIPTION OF RELATED ART

A related art lighting apparatus is a vehicle headlamp having a plurality of light emitting devices such as LEDs. Light from each of the light emitting devices is reflected by a reflector to form a hot zone light distribution pattern and a diffused light distribution pattern for a low beam (see, e.g., JP 2008-226706 A and JP 2008-226707 A).

When forming a low beam light distribution pattern, luminance in a region near a upper cutoff line of the pattern is increased to provide a clear cutoff line so as to improve long-distance visibility. The low beam light distribution pattern may have a horizontally extending cutoff line and an obliquely extending cutoff line, which form an angle with each other.

BRIEF SUMMARY

Illustrative aspects of the present invention provide a lighting apparatus capable of forming cutoff lines which form an angle with each other with a simple structure.

According to an illustrative aspect of the present invention, a lighting apparatus includes a light source having a light emitting surface, and a reflector configured to reflect light from the light source to form a light distribution pattern having a first cutoff line and a second cutoff line such that the first cutoff line and the second cutoff line form an angle with each other. The reflector is configured to form the first cutoff line and the second cutoff line by reflection images of the same edge of the light emitting surface.

Other aspects and advantages of the invention will be apparent from the following description, the drawings and the claims.

DETAILED DESCRIPTION

Hereinafter, exemplary embodiments of the present invention will be described in detail with reference to the drawings. However, the following exemplary embodiments do not limit the scope of the claimed invention.

Figure 1B:
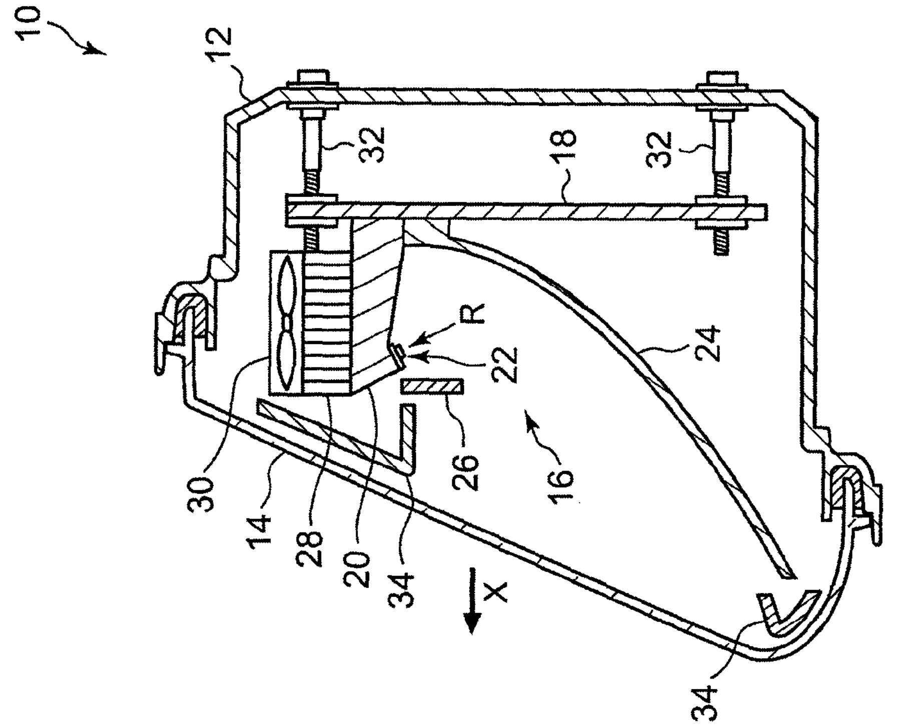
FIG. 1B is a sectional view taken along the line I-I in FIG. 1A.
Figure 1A:
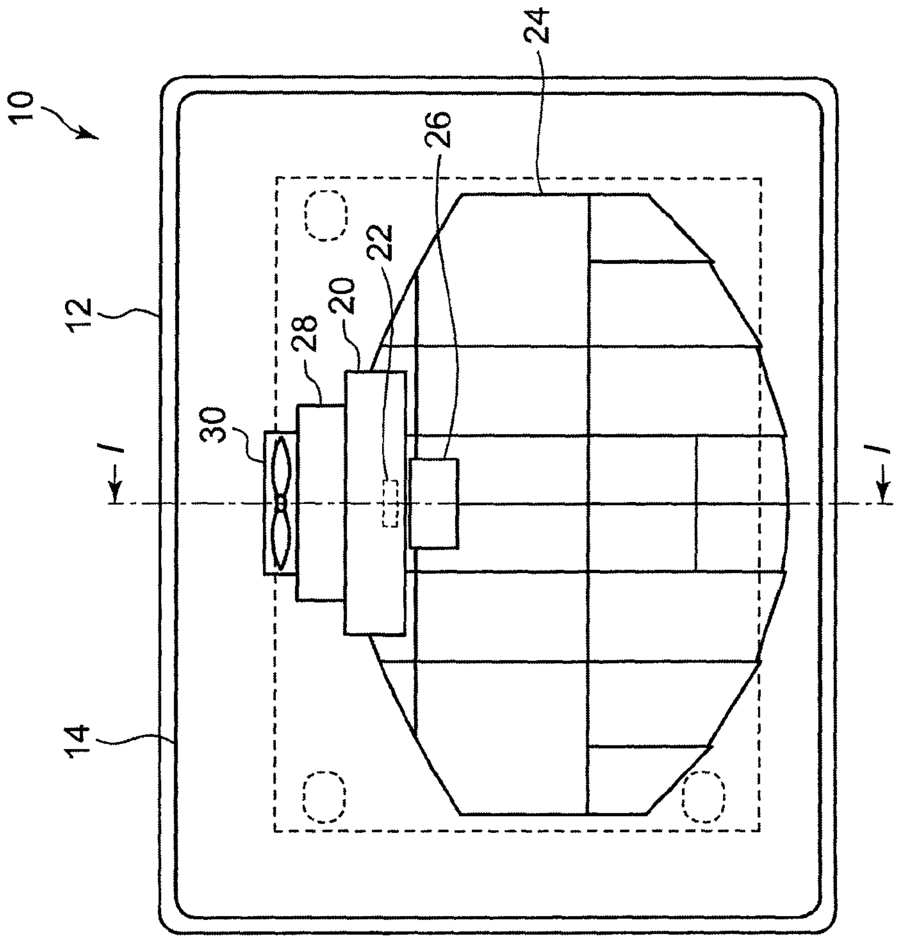
FIG. 1A is a front view of a lighting apparatus according to a first exemplary embodiment of the present invention.

According to a first exemplary embodiment of the present invention, a lighting apparatus is a vehicle headlamp 10 shown in FIGS. 1A and 1B. The vehicle headlamp 10 includes a housing 12, an outer cover 14, and a lamp unit 16. The arrow X in FIG. 1B indicates a front direction from the headlamp 10. The vehicle headlamp 10 is mounted on a vehicle in a pair, on right and left portions of a front of a vehicle.

The housing 12 has an opening portion. The outer cover 14 is made of transparent resin or glass. A peripheral edge of the outer cover 14 is attached to the opening portion of the housing 12, so that a lamp chamber is provided in a region surrounded by the housing 12 and the outer cover 14.

The lamp unit 16 is arranged in the lamp chamber to irradiate light in the front direction from the headlamp 10. The lamp unit 16 includes a support plate 18, a support base 20, a light emitting module 22, a reflector 24, a shade 26, a heat sink 28, and a cooling fan 30. The lamp unit 16 is configured to form a low beam light distribution pattern. An extension reflector 34 having an opening, through which light reflected by the reflector 24 travels forward from the lamp unit 16, is arranged in front of the lamp unit 16.

The support plate 18 is attached to the housing at three position near the corners of the support plate 18 via aiming screws 32. The support base 20 is a rectangular member that is thicker than the support plate 18, and a side face of the support base 20 is fixed to the front surface of the support plate 18. The light emitting module 22 serving as a light source is mounted on the lower surface of support base 20 such that a main optical axis of the light emitting module 22 is directed slightly toward the back of the lamp unit 16. The support base 20 is formed of a high thermal conductivity material, such as aluminum, so as to efficiently collect heat generated by the light emitting module 22. The cooling fan 30 is mounted on the upper surface of the support base 20 via the heat sink 28. The light emitting module 22 is cooled by the cooling fan 30 via the support base 20 and the heat sink 28, so that temperature increase of the light emitting module 22 is suppressed.

The reflector 24 is mounted on the front surface of the support plate 18 and below the support base 20. The reflector 24 reflects light from the light emitting module 22 in the front direction from the headlamp 10 to form a low beam light distribution pattern.

The shade 26 is a plate member, and is arranged near the light emitting module 22 to extend in a vertical direction. The shade 26 shields light rays that are reflected by an extension reflector 34 and then reflected by the reflector 24*d* in a direction toward a region above the low beam light distribution pattern. Consequently, it is possible to suppress glare to a person in front of the vehicle which may be caused by light reflected by the extension reflector 34, which does not provide an effective reflecting surface in forming an intended light distribution pattern. Further, because the shade 26 blocks light directed toward a region above a cutoff line of the low beam light distribution pattern, the shade 26 serves to provide a clear cutoff line. The shade 26 may not necessarily extend in the vertical direction, and may extend in a horizontal direction or in a direction inclined with respect to the horizontal direction. The shade 26 is arranged so as not to block light from the light emitting module 22 traveling directly toward the reflector 24.

Figure 2:
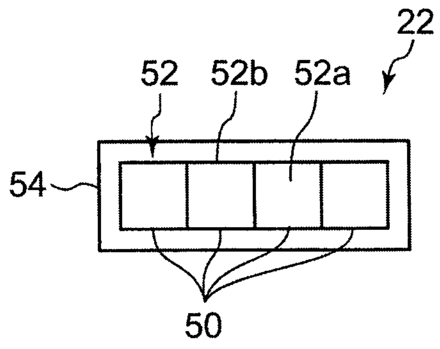
FIG. 2 is a view of a light emitting module observed from a direction R in FIG. 1B.
Figure 3A:
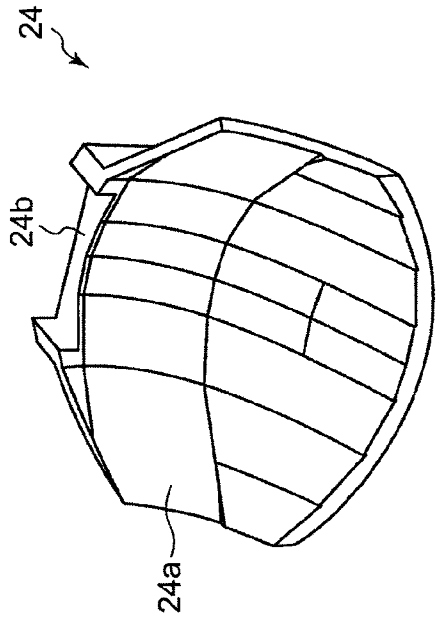
FIG. 3A is a perspective view of a reflector of the lighting apparatus.
Figure 3B:
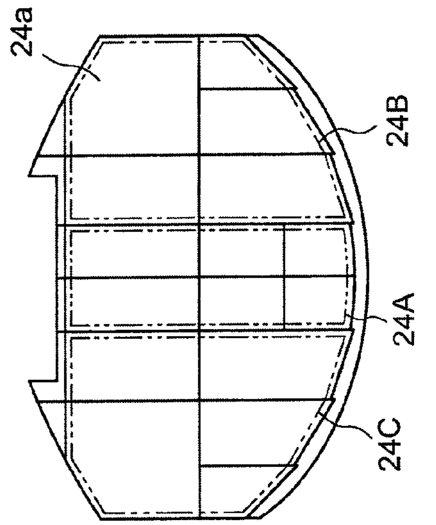
FIG. 3B is a front view of the reflector.
Figure 3C:
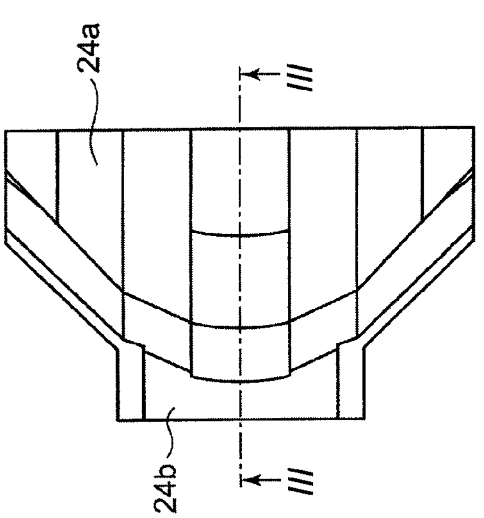
FIG. 3C is a top view of the reflector.
Figure 3D:
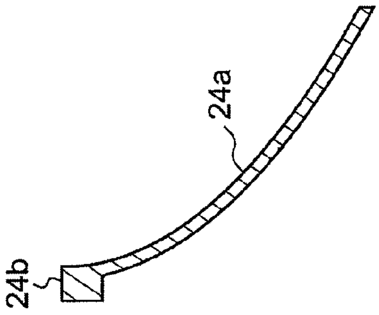
FIG. 3D is a sectional view taken along the line III-III in FIG. 3C.

As shown in FIG. 2, the light emitting module 22 includes a light emitting array 52 having a plurality of light emitting devices 50, and a substrate 54. According to this exemplary embodiment, four light emitting devices 50 are provided in the light emitting module 22, and are mounted on the substrate 54. The number of light emitting devices 50 is not limited to four, and may be one or more.

Each of the light emitting devices 50 includes a semiconductor light emitting element and a phosphor. According to this exemplary embodiment, each of the light emitting device 50 is configured to emit white light. More specifically, a blue LED which primarily emits blue light is used as the semiconductor light emitting element, and the phosphor is adapted to perform wavelength conversion from blue light to yellow light. When the semiconductor light emitting element emits light, additive color mixing of the blue light from the semiconductor light emitting element and the yellow light obtained by the wavelength conversion causes the light emitting device 50 to emit white light from its light emitting surface.

The light emitting devices 50 are not limited to those adapted to emit white light. For example, the light emitting devices 50 may be adapted to emit light having other colors, such as light yellow or light blue. Further, semiconductor light emitting elements that primarily emit light of other wavelengths, e.g., ultraviolet light, can be employed also.

According to this exemplary embodiment, each of the light emitting devices 50 has a square shape, but may be in a form of other rectangular shapes. The light emitting devices 50 are arranged in a row such that adjacent sides of the adjacent light emitting devices 50 adjoin each other. Accordingly, the light emitting array 52 functions as an single surface light source having a light emitting surface 52*a* of an elongated rectangular shape. A single rectangular light emitting device can be used instead of the light emitting array 52. The light emitting surface 52*a* of The light emitting array 52 may be configured to have a shape other than the rectangular shape. Further, the light emitting surface 52*a* need not be a flat surface, as long as the light emitting surface 52 has an edge for forming a first cutoff line CL1 and a second cutoff line CL2, which will be described below.

The rectangular light emitting surface 52*a* has a total of four edges, i.e., two long side edges and two short side edges. Among the four edges, a top edge 52*b*, which is one of the long side edges, is used to form the cutoff lines of the low beam light distribution pattern.

As shown in FIGS. 3A to 3D, the reflector 24 has a reflecting surface 24*a* and a concave portion 24*b*. The concave portion 24*b* is configured to fit onto a lower portion of the support base 20 so as to position the reflector 24 with respect to the support base 20.

The reflecting surface 24*a* has a hot zone forming portion 24A and diffused pattern forming portions 24B, 24C. The hot zone forming portion 24A is arranged between the diffused pattern forming portions 24B, 24C. When observed from the front, i.e., in the direction toward the back of the headlamp 10, the diffused pattern forming portion 24B is arranged on the right side of the hot zone forming portion 24A, and the other diffused pattern forming portion 24C is arranged on the left side of the hot zone forming portion 24A. The hot zone forming portion 24A forwardly reflects light from the light emitting module 22 to form a hot zone light distribution pattern PA (see FIG. 5B). The diffused pattern forming portions 24B, 24C forwardly reflect light from the light emitting module 22 to form a diffused light distribution pattern PB (see FIGS. 6B and 7B).

The hot zone forming portion 24A is arranged such that an average distance to the light emitting module 22 is shorter than an average distance from the diffused pattern forming portions 24B, 24C to the light emitting module 22. The average distance is an average of distances between the center of the light emitting module 22 and a surface of the hot zone forming portion 24A or surfaces of the diffused pattern forming portions 24B, 24C. The average distance can be calculated by integration. According to this configuration, a high illuminance hot zone of the low beam light distribution pattern can be improved.

Each of the hot zone forming portion 24A and the diffused pattern forming portions 24B, 24C has a plurality of segments. Each of the segments is formed as a smooth curved surface. Adjacent ones of the segments are adjoined via a convex or concave border.

Figure 4:
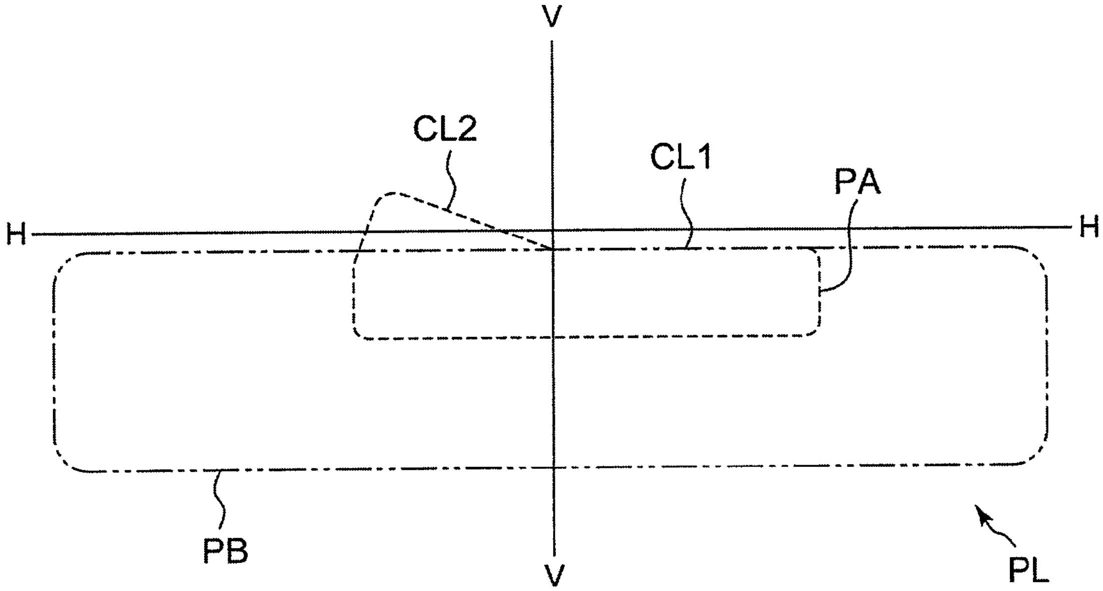
FIG. 4 is a diagram illustrating a low beam light distribution pattern formed on a virtual vertical screen by a lamp unit of the lighting apparatus.

FIG. 4 is a diagram illustrating a low beam light distribution pattern PL formed on a virtual vertical screen by the lamp unit 16. The low beam light distribution pattern PL has the first cutoff line CL1 and the second cutoff line CL2, which extend nonparallel to each other and form an angle with each other. The first cutoff line CL1 extends horizontally on the right side of the vertical line V-V and slightly below (e.g., at an angle of about 0.9 degrees) the horizontal line H-H. The second cutoff line CL2 obliquely extends upward toward the left from the point where the first cutoff line CL1 meets the vertical line V-V. The shade 26 is provided to shield light directed toward a region above the first cutoff line CL1 and the second cutoff lines CL2.

The lamp unit 16 forms the low beam light distribution pattern PL. More particularly, the hot zone forming portion 24A reflects light from the light emitting module 22 and forms the hot zone light distribution pattern PA including the first cutoff line CL1 and the second cutoff line CL2. The diffused pattern forming portions 24B, 24C form the diffused light distribution pattern PB which is horizontally longer than the hot zone light distribution pattern PA. As described above, the hot zone forming portion 24A is arranged between the diffused pattern forming portions 24B, 24C. By arranging the diffused pattern forming portions 24B, 24C, which are configured to diffuse light, on respective sides of the hot zone forming portion 24A, it is possible to avoid the reflector 24 being a complicated structure.

The low beam light distribution pattern PL is formed by superimposing the hot zone light distribution pattern PA and the diffused light distribution pattern PB. The diffused light distribution pattern PB is formed to extend horizontally, and to have the same horizontal length as that of the entire low beam light distribution pattern PL. The diffused light distribution pattern PB also forms the first cutoff line CL1 along the upper edge thereof on the right side of the vertical line V-V.

The hot zone light distribution pattern PA is formed to include a hot zone of the low beam light distribution pattern PL where high illuminance is required. The hot zone light distribution pattern PA includes the first cutoff line CL1 and the second cutoff line CL2, which form an angle with each other. The hot zone light distribution pattern PA is smaller than the diffused light distribution pattern PB, both in the horizontal direction and in the vertical direction.

Figure 5A:
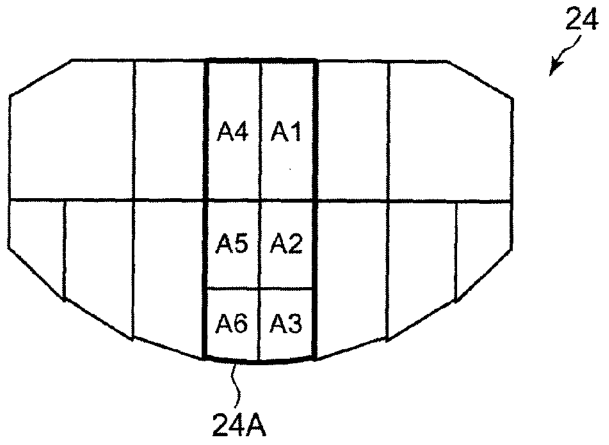
FIG. 5A is a diagram illustrating each segment of a hot zone forming portion of the reflector.
Figure 5B:
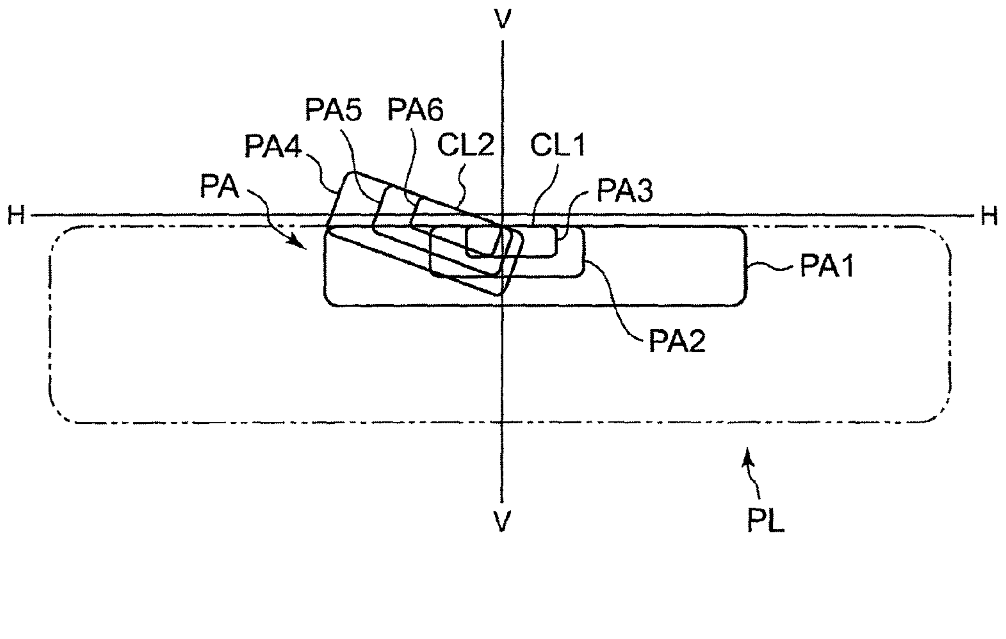
FIG. 5B is a diagram illustrating a hot zone light distribution light pattern formed on the virtual vertical screen by the hot zone forming portion.

FIG. 5A is a diagram illustrating the segments of the hot zone forming portion 24A, and FIG. 5B is a diagram illustrating the hot zone light distribution light pattern PA formed on the virtual vertical screen by the hot zone forming portion 24A. FIG. 5A is a schematic front view of the reflector 24 observed from the front of the reflector 24, i.e., in the direction toward the back of the headlamp 10. FIG. 5B is a schematic view of the hot zone light distribution pattern PA observed in the front direction from the headlamp 10.

The hot zone forming portion 24A is divided into three rows and two columns so that the hot zone forming portion 24A has six segments A1, A2, A3, A4, A5, A6, each of which having a rectangular shape. The segments A1, A2, A3 are arranged in the right column in a front view. The segments A1, A2, A3 are arranged in this order from top to bottom. The segments A4, A5, A6 are arranged in the left column in the front view. The segments A4, A5, A6 are arranged in this order from top to bottom.

The hot zone light distribution pattern PA is formed by superimposing projection images PA1, PA2, PA3, PA4, PA5, PA6. Each of the projection images PA1, PA2, PA3, PA4, PA5, PA6 is formed by light reflected from an associated one of the segments A1, A2, A3, A4, A5, A6.

Each of the segments A1, A2, A3 forms the associated one of the projection images PA1, PA2, PA3, each extending horizontally by utilizing the elongated rectangular shape of the light emitting surface 52*a*. More specifically, the projection image PAl has a horizontal length that is substantially the same as that of the hot zone light distribution pattern PA. The projection image PAl is formed so that the top edge thereof overlaps the first cutoff line CL1. The projection image PA1 is formed so that a horizontally central portion thereof is located on the right side of the vertical line V-V.

The projection image PA2 has a shorter horizontal length than the projection image PA1. The projection image PA2 is also formed such that the top edge thereof overlaps the first cutoff line CL1, and that a horizontally central portion thereof is located slightly to the right from the vertical line V-V. The projection image PA3 has a shorter horizontal length than the projection image PA2. The projection image PA3 is also formed such that the top edge thereof overlaps the first cutoff line CL1, and that a horizontally central portion thereof is located slightly to the right from the vertical line V-V.

The segments A1, A2, A3 form a light distribution pattern by superimposing the projection images PA1, PA2, PA3. Consequently, the light distribution pattern is formed such that the top edge thereof overlaps the first cutoff line CL1, and that illuminance gradually increases toward the vanishing point on the vertical line V-V.

Each of the segments A4, A5, A6 forms the associated one of the projection images PA4, PA5 PA6 extending substantially parallel to the second cutoff line CL2, utilizing the elongated rectangular shape of the light emitting surface 52*a*. More specifically, the projection image PA4 is formed to obliquely extend so that the top edge thereof overlaps the entire length of the second cutoff line CL2. The length of the projection image PA4 is about half of the length of the hot zone light distribution pattern PA. The projection image PA4 is formed so that the right end portion thereof is located slightly to the right from the vertical line V-V, and that the left end portion thereof is located at the left end portion of the hot zone light distribution pattern PA.

The projection image PA5 is smaller than the projection image PA4, both in a direction parallel to the second cutoff line CL2 and in a direction perpendicular to the second cutoff line CL2. The projection image PA5 is also formed to obliquely extend so that the top edge thereof overlaps the second cutoff line CL2. The projection image PA5 is formed so that the right end portion thereof is located between the vanishing point and the right end portion of the projection image PA4, and that the left end portion thereof is located closer to the vanishing point than from the left end portion of the projection image PA4.

The projection image PA6 is smaller than the projection image PA5, both in the direction parallel to the second cutoff line CL2 and in the direction perpendicular to the second cutoff line CL2. The projection image PA6 is also formed to obliquely extend so that the top edge thereof overlaps the second cutoff line CL2. The projection image PA6 is formed so that the right end portion thereof is located between the vanishing point and the right end portion of the projection image PA5, and that the left end portion thereof is located closer to the vanishing point than from the left end portion of the projection image PA5.

The segments A4, A5, A6 form a light distribution pattern obtained by superimposing the projection images PA4, PA5 PA6 so that the top edge thereof extends obliquely to overlap the second cutoff line CL2, and that illuminance increases toward the vanishing point.

The hot zone forming portion 24A forms the first cutoff line CL1 and the second cutoff line CL2 by a reflection image of the same top edge 52*b* of the light emitting surface 52*a*. A surface-emitting light source, such as an LED, having a planar light emitting surface has an edge. Distinct cutoff lines can be formed by utilizing an edge of such surface-emitting light source.

According to this exemplary embodiment, moreover, the light emitting array 52 has the elongated rectangular light emitting surface 52*a*. Thus, light from the light emitting surface need not be reflected in an excessively diffusing manner to form an elongated light distribution pattern, which also advantageous in forming distinct cutoff lines.

In addition, the segments A1, A2, A3 form the first cutoff line CL1 by respective reflection images of the top edge 52*b* of the light emitting surface 52*a*. The segments A4, A5, A6 form the second cutoff line CL2 by respective reflection images of the top edge 52*b* of the light emitting surface 52*a*. That is, the first cutoff line CL1 and the second cutoff line CL2, which form an angle with each other, are formed by the reflection images of the same top edge 52*b* of the light emitting surface 52*a*. Consequently, the cost for the light source can be suppressed, as compared with a case in which a plurality of light sources are used, e.g., in the case of forming the first cutoff line CL1 and the second cutoff line CL2 by the reflection images of two light emitting arrays that extend so as to form an angle each other. Further, as compared with a case in which two different edges of the light emitting surface are used to form the first cutoff line CL1 and the second cutoff line CL2, configurations of the light source and the reflector can be simplified.

The segments A1, A2, A3 for forming the first cutoff line CL1 are arranged to adjoin the segments A4, A5, A6 for forming the second cutoff line CL2. Consequently, the size of the hot zone forming portion 24A can be suppressed, as compared with a case in which the segments A1, A2, A3 are spaced from the segments A4, A5, A6.

The segments A1, A2, A3 may be configured such that one of the segments A1, A2, A3 forms the first cutoff line CL1 and the remaining ones of the segments A1, A2, A3 do not form the first cutoff line CL1. Similarly, the segments A4, A5, A6 may be configured one of the segments A4, A5, A6 forms the second cutoff line CL2 and the remaining ones of the segments A4, A5, A6 do not form the second cutoff line CL2.

Figure 6A:
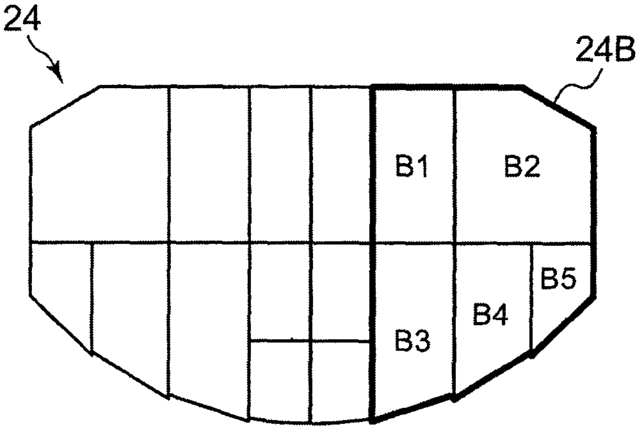
FIG. 6A is a diagram illustrating each segment of a first diffused pattern forming portion of the reflector.
Figure 6B:
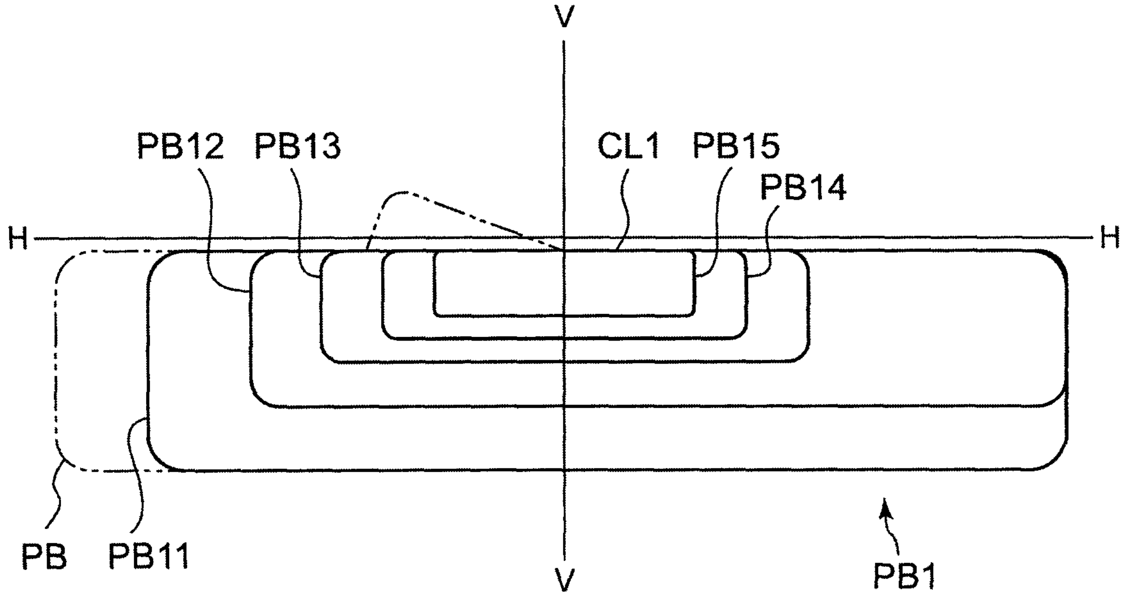
FIG. 6B is a diagram illustrating a first diffused light distribution pattern formed on a virtual vertical screen by the first diffused pattern forming portion.

FIG. 6A is a diagram illustrating the segments of the diffused pattern forming portion 24B. FIG. 6B is a diagram illustrating a first diffused light distribution pattern PB1 formed on a virtual vertical screen by the diffused pattern forming portion 24B. FIG. 6A is a schematic front view of the reflector 24 observed from the front of the reflector 24, i.e., in the direction toward the back of the headlamp 10. FIG. 6B is a schematic view of the first diffused light distribution pattern PB1 observed in the front direction from the headlamp 10.

The diffused pattern forming portion 24B is divided into two rows. The upper row is divided into two segments arranged, and the lower row is divided into three segments. Consequently, the diffused pattern forming portion 24B is divided into the five segments B1, B2, B3, B4, B5. Each of the segments B1, B2 has a rectangular shape. Because the bottom edge of the diffused pattern forming portion 24B has a circular-arc shape, each of the segments B3, B4, B5 has a trapezoidal shape obtained by obliquely cutting a lower portion of the rectangular shape. The segments B1, B2 are arranged on the upper row of the diffused pattern forming portion 24B in this order from left to right. The segments B3, B4, B5 are arranged on the lower row of the diffused pattern forming portion 24B in this order from left to right.

The first diffused light distribution pattern PB1 is formed by superimposing projection images PB11, PB12, PB13, PB14, PB15. Each of the projection images PB11, PB12, PB13, PB14, PB15 is formed by light reflected from an associated one of the segments B1, B2, B3, B4, B5.

Each of the segments B1, B2, B3, B4, B5 forms the associated one of the projection images PB11, PB12, PB13, PB14, PB15 extending horizontally by utilizing the elongated rectangular shape of the light emitting surface 52*a*. More specifically, the projection image PB11 is formed to extend horizontally so that the length thereof is shorter than that of the diffused light distribution pattern PB. The projection image PB11 is formed such that the right end portion is at the right end portion of the diffused light distribution pattern PB, and that the left end portion thereof is closer to the vertical line V-V than from the left end portion of the diffused light distribution pattern PB. The projection image PB11 is formed such that the top edge thereof overlaps the first cutoff line CL1.

The projection image PB12 is formed to extend horizontally and to have a length shorter than that of the projection image PB11. The projection image PB12 is formed such that the right end portion thereof is at the right end portion of the diffused light distribution pattern PB, that the left end portion thereof is closer to the vertical line V-V than from the left end portion of the projection image PB11, and that the top edge thereof overlaps the first cutoff line CL1.

The projection image PB13 is formed to have a length shorter than that of the projection image PB12 and to extend horizontally. The projection image PB13 is formed such that a horizontally central portion thereof is near the vertical line V-V, that the left end portion thereof is closer to the vertical line V-V than from the left end portion of the projection image PB12, and that the top edge thereof overlaps the first cutoff line CL1.

The projection image PB14 is formed to have a length shorter than that of the projection image PB13, and to extend horizontally. The projection image PB14 is formed such that a horizontally central portion thereof is near the vertical line V-V, that the left and right end portions thereof are closer to the vertical line V-V than from those of the projection image PB13, respectively, and that the top edge thereof overlaps the first cutoff line CL1.

The projection image PB15 is formed to have a length shorter than that of the projection image PB14, and to horizontally extend. The projection image PB15 is formed such that a horizontally central portion is near the vertical line V-V, that the left and right end portions thereof are closer to the vertical line V-V than from those of the projection image PB14, respectively, and that the top edge thereof overlaps the first cutoff line CL1.

Figure 7A:
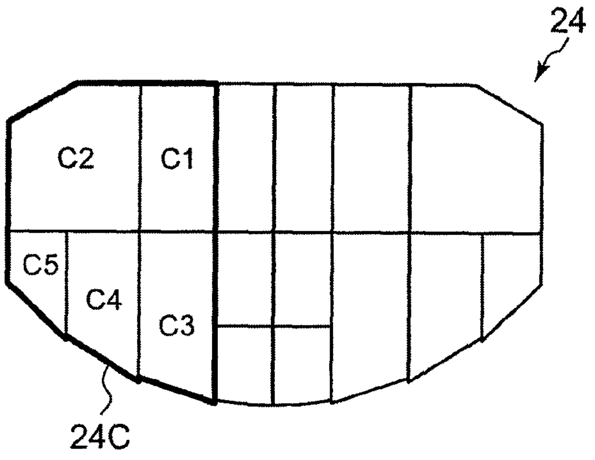
FIG. 7A is a diagram illustrating each segment of a second diffused pattern forming portion of the reflector.
Figure 7B:
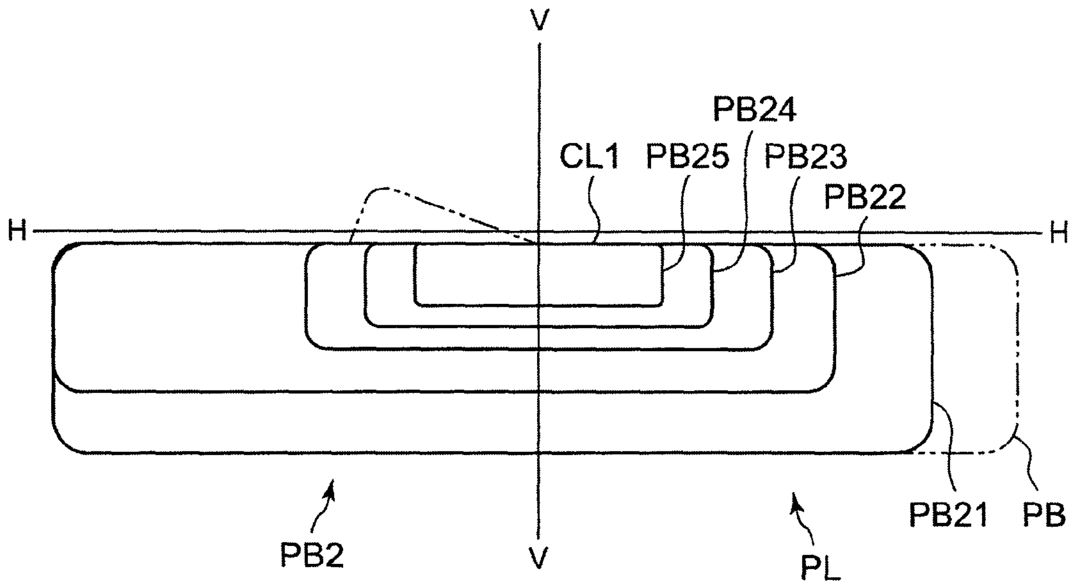
FIG. 7B is a diagram illustrating a second diffused light distribution pattern formed on a virtual vertical screen by the second diffused pattern forming portion.

FIG. 7A is a diagram illustrating the segments of the diffused pattern forming portion 24C. FIG. 7B is a diagram illustrating a second diffused light distribution pattern PB2 formed on a virtual vertical screen by the diffused pattern forming portion 24C. FIG. 7A is a schematic front view of the reflector 24 observed from the front of the reflector 24, i.e., in the direction toward the back of the headlamp 10. FIG. 7B is a schematic view of the second diffused light distribution pattern PB2 observed in the front direction from the headlamp 10.

The diffused pattern forming portion 24C is divided into two rows. The upper row is divided into two segments, and the lower row is divided into three segments. Consequently, the diffused pattern forming portion 24C is divided into the five segments C1, C2, C3, C4, C5. Each of the segments C1, C2 has a rectangular shape. Because the bottom edge of the diffused pattern forming portion 24C has a circular-arc shape, each of the segments C3, C4, C5 has a trapezoidal shape obtained by obliquely cutting a lower portion of the rectangular shape. The segments C1, C2 are arranged in the upper row of the diffused pattern forming portion 24C in this order from right to left. The segments C3, C4, C5 are arranged in the row line of the diffused pattern forming portion 24C in this order from right to left.

The second diffused light distribution pattern PB2 is formed by superimposing projection images PB21, PB22, PB23, PB24, PB25. Each of the projection images PB21, PB22, PB23, PB24, PB25 is formed by light reflected from an associated one of the segments C1, C2, C3, C4, C5.

Each of the segments C1, C2, C3, C4, C5 forms the associated one of the projection images PB21, PB22, PB23, PB24, PB25 extending horizontally by utilizing the elongated rectangular shape of the light emitting surface 52*a*. More specifically, the projection image PB21 is formed to extend horizontally so that the length thereof is shorter than that of the diffused light distribution pattern PB. The projection image PB21 is formed such that the left end portion thereof is at the left end portion of the diffused light distribution pattern PB, and that the right end thereof is closer to the vertical line V-V than from the right end portion of the diffused light distribution pattern PB. The projection image PB21 is formed such that the top edge thereof overlaps the first cutoff line CL1.

The projection image PB22 is formed to extend horizontally and to have a length shorter than that of the projection image PB21. The projection image PB22 is formed such that the left end portion thereof is at the left end portion of the diffused light distribution pattern PB, that the right end portion thereof is closer to the vertical line V-V than from the right end portion of the projection image PB21, and that the top edge thereof overlaps the first cutoff line CL1.

The projection image PB23 is formed to have a length shorter than that of the projection image PB22 and to extend horizontally. The projection image PB23 is formed such that a horizontally central portion thereof is near the vertical line V-V, that the right end portion thereof is closer to the vertical line V-V than from the right end portion of the projection image PB22, and that the top edge thereof overlaps the first cutoff line CL1.

The projection image PB24 is formed to have a length shorter than that of the projection image PB23, and to extend horizontally. The projection image PB24 is formed such that a horizontally central portion thereof is near the vertical line V-V, that the left and right end portions thereof are closer to the vertical line V-V than from those of the projection image PB23, respectively, and that the top edge thereof overlaps the first cutoff line CL1.

The projection image PB25 is formed to have a length shorter than that of the projection image PB24, and to horizontally extend. The projection image PB25 is formed such that a horizontally central portion is near the vertical line V-V, that the left and right end portions thereof a closer to the vertical line V-V than from those of the projection image PB24, respectively, and that the top edge thereof overlaps the first cutoff line CL1.

Thus, the diffused pattern forming portion 24B forms the first diffused light distribution pattern PB1 obtained by superimposing the projection images PB11, PB12, PB13, PB14, PB15 from the segments B1, B2, B3, B4, B5. The diffused pattern forming portion 24C forms the second diffused light distribution pattern PB2 obtained by superimposing the projection images PB21, PB22, PB23, PB24, PB25 from the segments C1, C2, C3, C4, C5. Accordingly, the diffused pattern forming portions 24B, 24C form the diffused light distribution pattern PB by superimposing the first diffused light distribution pattern PB1 and the second diffused light distribution pattern PB2 such that the top edge of the diffused light distribution pattern PB overlaps the first cutoff line CL1, and that illuminance increases toward the vanishing point.

Figure 8:
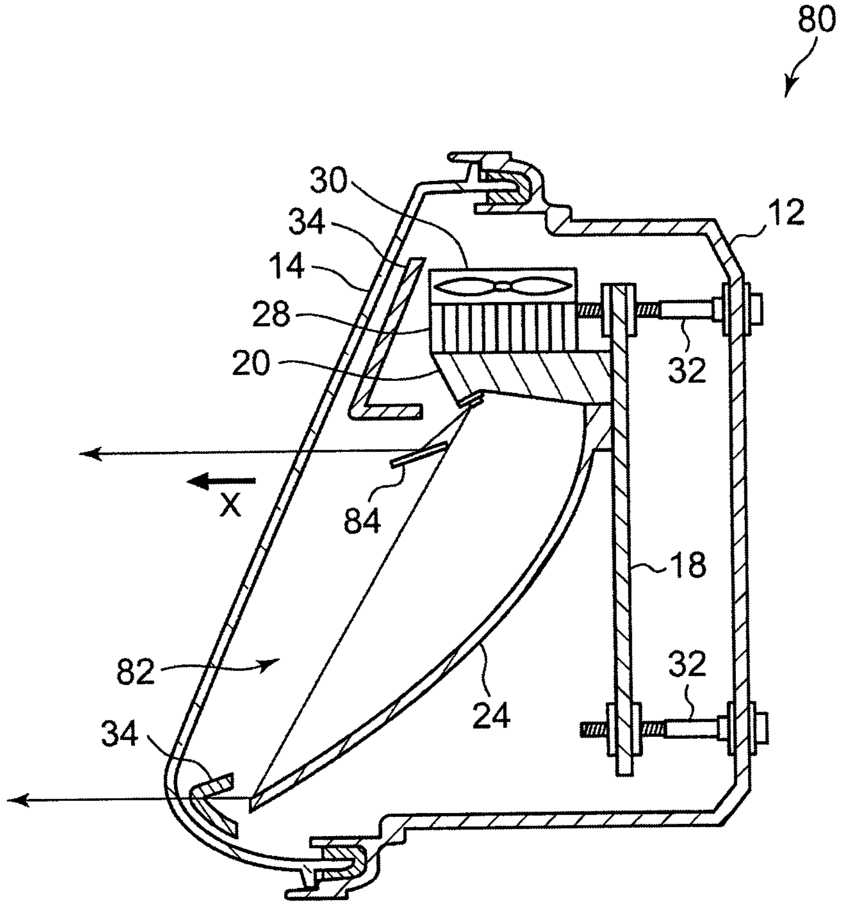
FIG. 8 is a sectional view of a lighting apparatus according to a second exemplary embodiment of the present invention.

FIG. 8 is a sectional view of a vehicle headlamp 80 according to a second exemplary embodiment of the present invention. The vehicle headlamp 80 is configured similarly to the vehicle headlamp 10 of the first exemplary embodiment. Hereinafter, portions of the vehicle headlamp 80 similar that are similar to those of the vehicle headlamp 10 of first exemplary embodiment is designated with the same reference numerals, detailed description thereof will be omitted.

A vehicle headlamp 80 is different from the vehicle headlamp 10 of the first exemplary embodiment in that a lamp unit 82 is provided instead of the lamp unit 16. The lamp unit 82 is different from the lamp unit 16 of the first exemplary embodiment in that an auxiliary reflector 84 is provided in the lamp unit 82, instead of the shade 26.

The auxiliary reflector 84 is arranged near the light emitting module 22 and is fixed to the support base 20. The auxiliary reflector 84 reflects a portion of the light from the light module 22 toward an overhead sign (OHS) region in a direction slightly upward than the traveling direction of the light reflected by the reflector 24. The auxiliary reflector 84 is arranged such that the auxiliary reflector 84 does not block light from the light emitting module 22 traveling directly toward the reflector 24, but blocks light traveling toward the extension reflector 34. That is, the auxiliary reflector 84 serves as a reflecting surface for irradiating OHS, and also as a shade that blocks light directed toward the extension reflector 34.

While the present invention has been described with reference to certain exemplary embodiments thereof, the scope of the present invention is not limited to the exemplary embodiments described above, and it will be understood by those skilled in the art that various changes and modifications may be made therein, including a combination of features of different exemplary embodiments, without departing from the scope of the present invention as defined by the appended claims.

For example, according to one modification, the reflector 24 is provided to reflect light from the light emitting module 22 in the front direction from the headlamp 10 so as to form at least a portion of a high beam light distribution pattern, instead of the low beam light distribution pattern PL. In this case also, the at least a part of the high beam light distribution pattern formed by the reflector 24 has a first cutoff line and a second cutoff line, which form an angle with each other. The reflector 24 forms the first cutoff line and the second cutoff line by reflection images of the same edge of the light emitting surface 52*a*.

For example, when forming a split high-beam light distribution pattern, need for forming a plurality of cutoff lines arises. The lamp unit can be adapted to form two of the cutoff lines forming an angle with each other without making the configuration of the reflector 24 complicated.

According to another modification, the lamp unit is adapted for use in lighting apparatuses other than a vehicle headlamp. For example, the lamp unit can be used for general lighting or for decorative lighting. In this case also, the reflector 24 forms at least a part of the light distribution pattern having a first cutoff line and a second cutoff line, which form an angle with each other. The reflector 24 forms the first cutoff line and the second cutoff line by reflection images of the same edge of the light emitting surface 52*a* without having a complicated structure.

What is claimed is:

1. A lighting apparatus comprising:

a light source having a light emitting array comprising a plurality of light emitting devices mounted on a substrate, the light emitting array have a single light emitting surface of an elongated rectangular shape with four side edges; one of the side edges being used to form a first cut-off line and a second cut-off line; and a reflector configured to reflect light from the light source to form a light distribution pattern having a first cutoff line and a second cutoff line, the first cutoff line and the second cutoff line forming an angle with each other, wherein the reflector is configured to form the first cutoff line by a first reflection image of said one of the side edges of the light emitting surface and to form the second cutoff line by a second reflection image of said one of the side edges of the light emitting surface.

2. The lighting apparatus according to claim 1, further comprising an auxiliary reflector configured to reflect a portion of the light from the light source not directed toward the reflector.

3. The lighting apparatus according to claim 1, further comprising a hot zone light distribution pattern and a diffused light distribution pattern, wherein the diffused light distribution pattern forms the first cutoff line and the hot zone light distribution patter includes the first cutoff line and the second cutoff line.

4. The lighting apparatus according to claim 1, wherein the reflector comprises:

a first segment configured to form the first cutoff line by the first reflection image; and a second segment configured to form the second cutoff line by the second reflection image.

5. The lighting apparatus according to claim 4, wherein the first segment and the second segment are arranged to adjoin each other.

6. The lighting apparatus according to claim 1, further comprising a shade configured to block light traveling toward a region above the first cutoff line or the second cutoff line.

7. The lighting apparatus according to claim 6, wherein the shade is arranged near the light source.

8. The lighting apparatus according to claim 1, wherein the plurality of light emitting devices are arranged in a row such that adjacent sides of adjacent light emitting devices adjoin each other.

9. The lighting apparatus according to claim 8, wherein the plurality of light emitting devices have a square shape.

10. The lighting apparatus according to claim 1, wherein the lighting apparatus is a vehicle headlamp.

11. The lighting apparatus according to claim 10, wherein said light distribution pattern is a low beam light distribution pattern comprising:

a hot zone light distribution pattern having the first cutoff line and the second cutoff line; and a diffused light distribution pattern which is horizontally longer than the hot zone light distribution pattern, wherein the reflector comprises:

a hot zone forming portion configured to form the hot zone light distribution pattern; and a diffused pattern forming portion configured to form the diffused light distribution pattern.

12. The lighting apparatus according to claim 11, wherein an average distance from the hot zone forming portion to the light source is shorter than an average distance from the diffused pattern forming portion to the light source.

13. The lighting apparatus according to claim 11, wherein the diffused pattern forming portion comprises two sections, between which the hot zone forming portion is arranged.

* * * * *